US009215164B2

(12) United States Patent
Scharf et al.

(10) Patent No.: US 9,215,164 B2
(45) Date of Patent: Dec. 15, 2015

(54) MULTI-SOURCE CORRELATION OF NETWORK TOPOLOGY METRICS

(71) Applicant: Alcatel-Lucent, Paris (FR)

(72) Inventors: Michael Scharf, Stuttgart (DE); Thomas Voith, Kornwestheim (DE); Manuel Stein, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 179 days.

(21) Appl. No.: 14/075,294

(22) Filed: Nov. 8, 2013

(65) Prior Publication Data

US 2015/0131458 A1 May 14, 2015

(51) Int. Cl.
*H04L 1/00* (2006.01)
*H04L 12/721* (2013.01)
*H04L 12/715* (2013.01)

(52) U.S. Cl.
CPC .............. *H04L 45/123* (2013.01); *H04L 45/04* (2013.01); *H04L 45/70* (2013.01)

(58) Field of Classification Search
CPC ......... H04L 47/10; H04L 47/11; H04L 47/12; H04L 47/13
USPC .......... 370/252, 229, 230, 233–235, 237, 238
See application file for complete search history.

(56) References Cited

U.S. PATENT DOCUMENTS

2009/0022056 A1* 1/2009 Ninan et al. .................. 370/238

* cited by examiner

*Primary Examiner* — Dady Chery
(74) *Attorney, Agent, or Firm* — Kramer & Amado, P.C.

(57) ABSTRACT

Various exemplary embodiments relate to a method of determining a cost for a routing path in a network. The method includes: receiving a first metric for a plurality of links in a network, the first metric being a routing metric used to determine routing in the network; determining a routing path including a subset of the links based on the first metric, the routing path having an initial cost based on the first metric; receiving second metric information including a second metric that is different from the first metric; and calculating a corrected cost for the routing path based on the second metric.

18 Claims, 8 Drawing Sheets

MULTI-SOURCE CORRELATION OF NETWORK TOPOLOGY METRICS

TECHNICAL FIELD

Various exemplary embodiments disclosed herein relate generally to communications networks.

BACKGROUND

Communications networks are often designed to be transparent to end users. The network topology including intermediate nodes in a service provider's network is often hidden.

The Internet Engineering Task Force has created a working-group for application-layer traffic optimization (ALTO). One of the goals of ALTO is to expose network topology to allow applications to make smarter decisions. The IETF working-group has published requests for comments (RFCs) 5693 and 6708 defining various aspects of ALTO.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of determining a cost for a routing path in a network. The method includes: receiving a first metric for a plurality of links in a network, the first metric being a routing metric used to determine routing in the network; determining a routing path including a subset of the links based on the first metric, the routing path having an initial cost based on the first metric; receiving second metric information including a second metric that is different from the first metric; and calculating a corrected cost for the routing path based on the second metric information.

In various embodiments, the second metric is a routing metric used to determine routing for a second plurality of links in the network.

In various embodiments, the first metric is an interior gateway protocol (IGP) routing cost and the second metric is external gateway protocol (EGP) autonomous system (AS) path length.

In various embodiments, the method further includes: receiving a third metric, the third metric being a routing metric used to determine routing for a second plurality of links in the network; and updating the routing path based on the third metric to include the second plurality of links, wherein calculating a corrected cost for the routing path based on the second metric includes calculating a corrected cost for the routing path based on the second metric and the third metric.

In various embodiments, the step of calculating a corrected cost for the routing path based on the second metric includes determining a total value of the second metric information associated with the subset of the links.

In various embodiments, the second metric is a recessive metric.

In various embodiments, the method further includes: determining that the second metric is unavailable for a missing link of the first plurality of links; and requesting second metric data for the missing link.

In various embodiments, the method further includes: determining that a shortcut second metric is available for two non-adjacent vertices in the routing path; and substituting the shortcut second metric for a plurality of individual second metrics associated with links between the two non-adjacent vertices.

In various embodiments, the first metric and the second metric information are received from different sources.

In various embodiments, the method further includes: receiving third metric information including a point-to-point metric; and determining that the third metric information corresponds to a portion of the routing path, wherein calculating a corrected cost for the routing path based on the second metric includes calculating a corrected cost for the routing path based on the second metric and the third metric.

In various embodiments, the method further includes: generating a network topology including a corrected cost for a plurality of routing paths; and exposing the network topology to an external application.

Various exemplary embodiments relate to the above method encoded on a non-transitory machine-readable storage medium as instructions executable by a processor.

It should be apparent that, in this manner, various exemplary embodiments enable generating a network topology including total costs for routing paths. In particular, by correlating a routing metric with a recessive metric, the total cost may accurately account for recessive metrics in the network topology.

BRIEF DESCRIPTION OF THE DRAWINGS

In order to better understand various exemplary embodiments, reference is made to the accompanying drawings, wherein.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
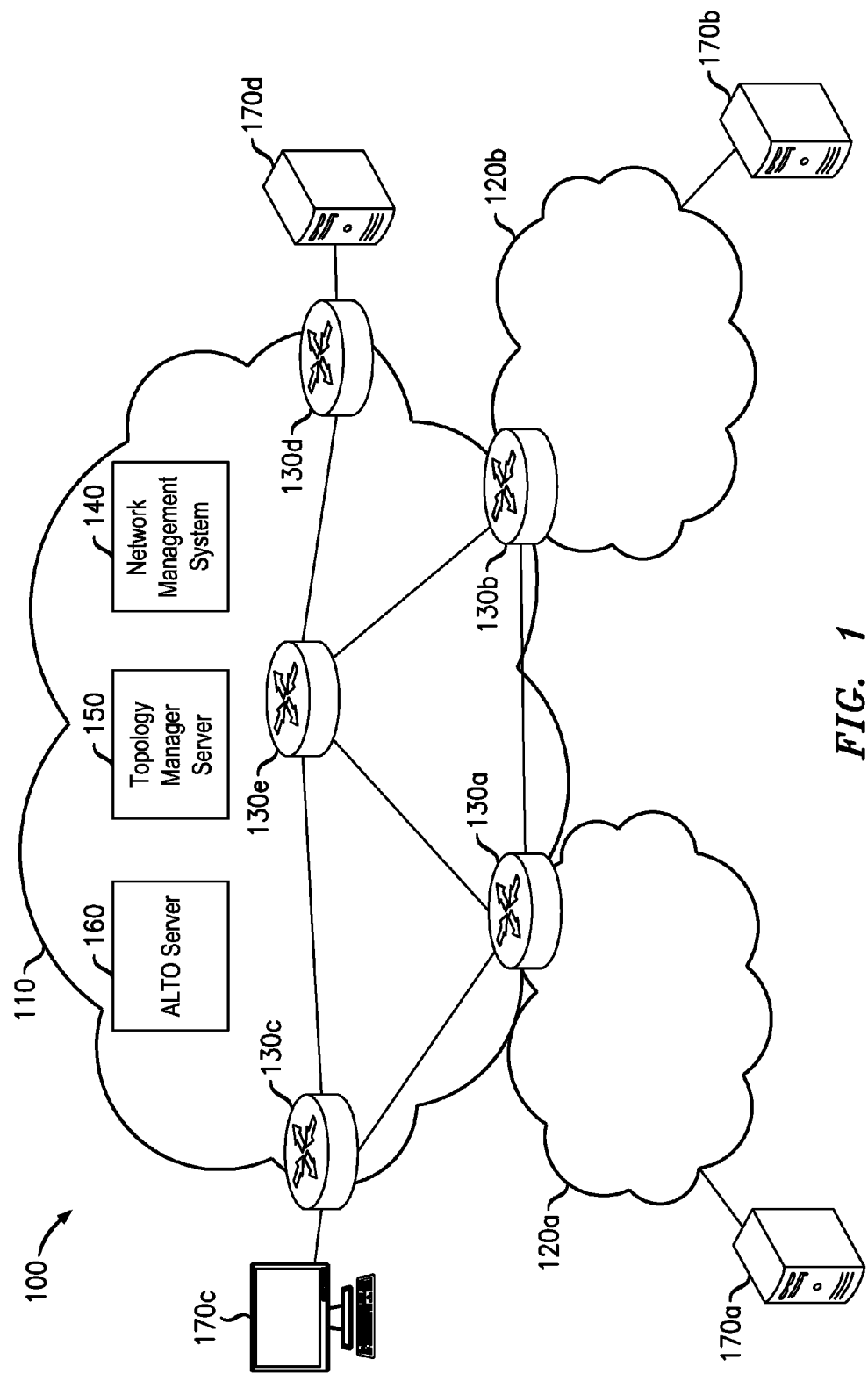
FIG. 1 illustrates an exemplary communications network.

FIG. 1 illustrates an exemplary communications network 100. Network 100 may provide communications between various end-user devices 170. Network 100 may include several sub-networks controlled by various entities such as network service providers. For example, a network service provider may own or control network 110 while other service providers may control networks 120a and 120b. Ownership and control of the sub-networks may determine what information is available for analysis.

Network 110 may be a network controlled by a network service provider. The network 110 may provide various network services to subscribers such as individuals, households, and businesses. The network 100 may be connected to additional networks such as networks 120 thus forming an internet. The network 110 may include routers 130, network management system 140, topology manager server 150, and application layer topology optimization (ALTO) server 160.

Routers 130 may include network routers, switches, hubs, or any other hardware for directing network communications to the correct destination. Routers 130 may perform particular functions based on their configuration and location in the network. For example, routers 130a and 130b may be edge routers located on the edge of the sub-network 110 and connected to sub-networks 120a or 120b, respectively. Routers 130a and 130b may receive routing information from sub-networks 120a or 120b. For example, routers 130a or 130b may receive exterior gateway protocol (EGP) information regarding an exterior sub-network 120a or 120b. Such information may include, for example, routing costs or other metrics for reaching network nodes such as node 170a and 170b. In various embodiments, the EGP information may be border gateway protocol (BGP) information. Routers 130c or 130d may be an access router that is connected to an access network for user equipment 170c and 170d, respectively. Router 130e may be a centrally located core router. Router 130e may provide policy functions.

Network management system 140 may be a network node that receives network management information from a plurality of network nodes such as routers 130. Network management system 140 may collect various metric regarding the performance of network 100 or sub-network 110. Network management system 140 may be able to request additional network metrics from network nodes. For example, network management system 140 may conduct a test to measure a metric such as network delay.

Topology manager server 150 may be a network node that analyzes network information and generates a network topology. Topology manager server 150 may collect information from individual network nodes including routers 130 or obtain information from network management system 140. Topology manager server 150 may analyze and correlate a plurality of metrics and provide a total cost for a network path. Topology manager server 150 may expose the network topology to subscribers, applications, or network operators to provide efficient usage of network 100 or sub-network 110. In various embodiments, topology manager server 150 may provide the network topology to ALTO server 160. In various embodiments, topology manager server 150 may be integrated with network management system 140 or ALTO server 160. The integrated network nodes may be physically co-located or share physical resources.

ALTO server 160 may be a network server configured to provide a network topology information to client nodes. ALTO server 160 may provide information according to Internet Engineering Task Force (IETF) requests for comments (RFC) 5693, 6708 or any subsequent versions of the ALTO requirements. In various embodiments, ALTO server 160 may receive a network topology from topology manager server 150 and use the received topology to provide information.

User equipment 170 may include any network device connected to network 100. For example, user equipment 170 may include end-user subscriber equipment such as personal computers, servers, laptop computers, tablets, smart phones, televisions, set-top boxes, video game consoles, or any other device accessing network 100. User equipment 170 may also include devices connected by businesses. For example, user equipment 170 may include application servers that provide services accessible to other network devices. User equipment 170 may obtain network topology information from ALTO server 160 or topology manager server 150. The network topology information may allow a user device to select services that will optimize an application. For example, a video game client or server may use network topology information to optimize connections for an interactive video game. A video game client may select a server that is indicated to have the best network connection. As another example, a cloud service provider may use the network topology to minimize data transfer costs.

Figure 2:
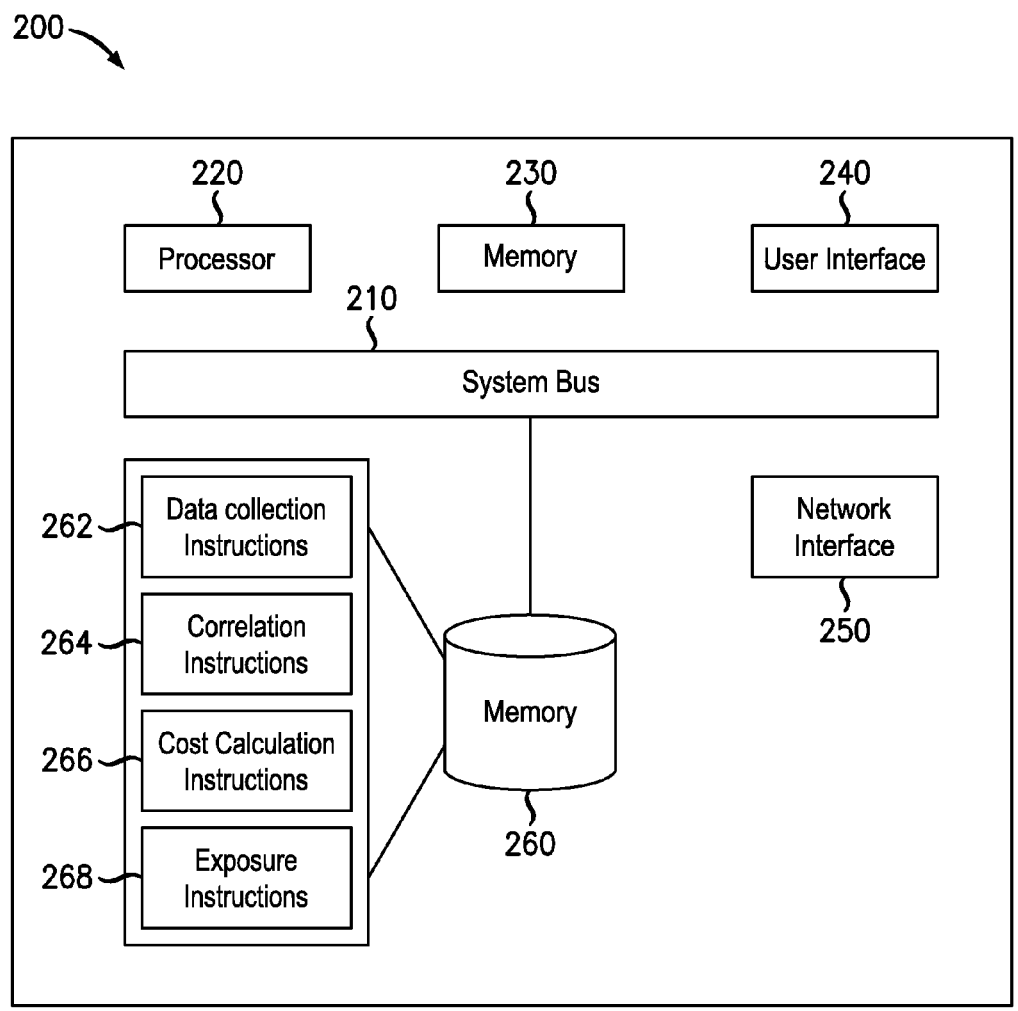
FIG. 2 illustrates an exemplary topology manager server.

FIG. 2 illustrates an exemplary hardware diagram of a topology manager server 150. The exemplary topology manager server 150 may include one or more system buses 210 that interconnect a processor 220, a memory 230, a user interface 240, a network interface 250, and a storage 260. It will be understood that FIG. 2 constitutes, in some respects, an abstraction and that the actual organization of the components of the server 150 may be more complex than illustrated. Various other arrangements will be apparent.

The processor 220 may be any hardware device capable of executing instructions stored in memory 230 or storage 260. As such, the processor 220 may include one or more microprocessors, field programmable gate arrays (FPGAs), application-specific integrated circuits (ASICs), or other similar devices.

The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices.

The user interface 240 may include one or more devices for enabling communication with a user such as an administrator. For example, the user interface 240 may include a display, a mouse, and a keyboard for receiving user commands.

The network interface 250 may include one or more devices for enabling communication with other hardware devices. For example, the network interface 250 may include a network interface card (NIC) configured to communicate according to the Ethernet protocol. Additionally, the network interface 250 may implement a TCP/IP stack for communication according to the TCP/IP protocols. Various alternative or additional hardware or configurations for the network interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon which the processor 220 may operate. As shown, the storage 260 stores data collection instructions 262, for enabling the collection of data from various sources, and correlation instructions 264, for enabling the correlation of routing metrics and recessive metrics. Additionally, the storage 260 may store cost calculation instructions 266, for determining costs based on a network topology, or exposure instructions 268, for enabling the controlled exposure of a network topology and calculated costs.

Figure 3:
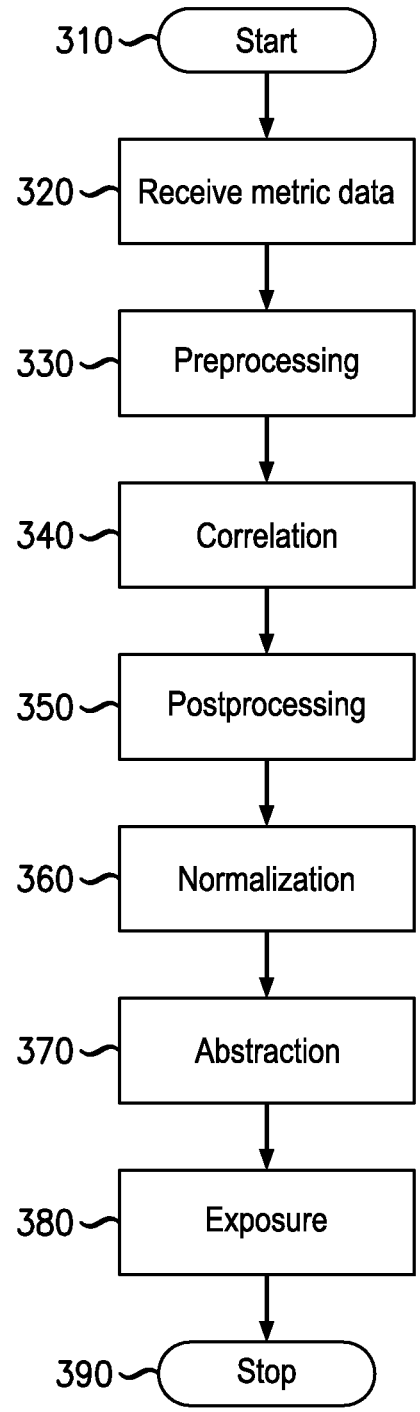
FIG. 3 illustrates a flowchart showing a method of exposing a network topology.

FIG. 3 illustrates a flowchart showing a method 300 of exposing a network topology. The method 300 may be performed by a topology manager server 150. The method 300 may begin at step 310 and proceed to step 320. In step 320, the topology manager server 150 may receive metric data. The metric data may be received from a network management system 140 or collected from network nodes such as routers 130 or user equipment 170. The metric data may be received periodically or upon request from topology manager server 150.

Data received from various network nodes may be classified into various types. One type of data received at topology manager server 150 may be routing metrics. A routing metric may be any metric used by routers 130 for determining a routing path for a packet. In various embodiments a interior gateway protocol (IGP) or exterior gateway protocol (EGP) link weight may be used as a routing metric. A routing metric may also be referred to as a dominant metric. Another type of data received at topology manager server 150 may be a recessive metric. As used herein, a recessive metric may be a metric that is not used by routers 130 for determining a routing path for a packet. A recessive metric may still provide important information regarding the network topology. Recessive metrics may include operations, administration, and maintenance (OAM) measurements. Recessive metrics may be measured as point-to-point measurements. For example, recessive metrics may include: latency, packet loss rate, capacity, available bandwidth, load, or other metrics. The classification of a metric may depend on the configuration of the particular network, in particular, on the metrics used for determining a routing path.

In step 330, topology manager server 150 may preprocess received data. Topology manager server 150 may ensure that expected data is received from various network nodes. Topology manager server 150 may compare data received from different nodes and determine whether the data is consistent.

In step 340, topology manager server 150 may correlate a plurality of metrics to provide a total cost metric. In various embodiments, topology manager server 150 may correlate a routing metric and a recessive metric. As will be explained in further detail below, the topology manager server 150 may determine a network topology based on the routing metric and calculate a corrected cost for the network topology based on the recessive metric. In various embodiments, topology manager server 150 may correlate a plurality of routing metrics. For example, the topology manager server 150 may correlate metrics for an interior gateway protocol (IGP) and an exterior gateway protocol (EGP). Topology manager server 150 may provide weights to each metric that is being correlated.

In step 350, topology manager server 150 may perform postprocessing of the network topology. For example, topology manager server 150 may request information that was unavailable when correlating metrics. Topology manager server 150 may request a missing metric from the network management system 140 or directly from a router 130. When the missing metric is received, the topology manager server 150 may store the metric for use in future correlation or recalculate a correlated metric.

In step 360, topology manager server 150 may perform normalization of the network topology. For example, cost values may be recalculated for relative consistency with previous topologies.

In step 370, topology manager server 150 may perform abstraction of the network topology. Abstraction may be used to present information in a more meaningful way or to hide sensitive information that the network operator does not want to publicly expose. For example, the names or addresses of various network nodes may be changed to protect the information from competing networks or hackers.

In step 380, topology manager server 150 may expose the network topology to external applications. In various embodiments, the topology manager server 150 may send the network topology to ALTO server 160. In various embodiments, the topology manager server 150 may act as an ALTO server. It should be apparent that additional methods of exposing the network topology known in the art such as direct transfer, a website, or an application programming interface (API) may be used. The method 300 may then proceed to step 390, where the method 300 ends. The method 300 may be repeated as needed to provide an up to date network topology.

Figure 4:
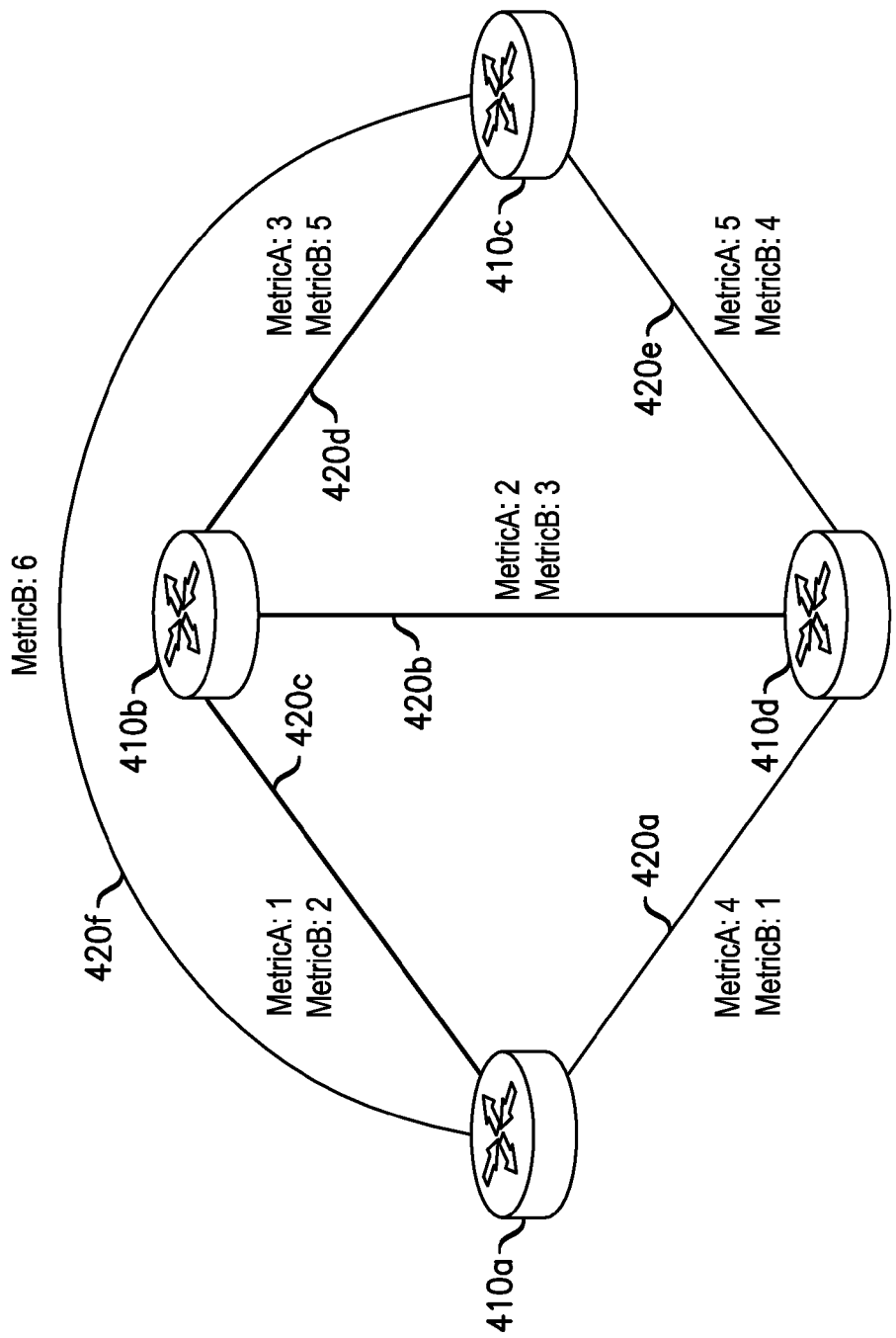
FIG. 4 illustrates a schematic diagram of a network topology.

FIG. 4 illustrates a schematic diagram of an example network topology 400. The network topology 400 may illustrate metric information received by topology manager server 150. The network topology 400 may be stored and presented as a graph with network nodes represented by vertices 410 and connections illustrated by edges 420. It should be apparent that other data structures such as arrays, tables, or linked lists may be used to store the information. Each vertex 410 may represent a router 230. Vertices corresponding to access routers or edge routers may be associated with a range of IP addresses serviced by that router. Each edge 420 may represent a connection for which a metric is available. The network topology 400 may include edges for both direct and indirect connections depending on the available metrics. For example, the network topology 400 may include two metrics: metricA and metricB. MetricA may be a routing metric used to determine the routing path of packets. Accordingly, each direct connection may have a value for metricA. MetricB may be a recessive metric. Accordingly, metricB may be available for each direct connection as well as indirect connections spanning more than one vertex. In the example topology 400, edges 420a-e may be direct connections having both metricA and metricB. Edge 420f, connecting vertex 410a and vertex 410c may have a value for only metricB. The absence of a value for metricA may indicate that no routing metric is available because there is no direct connection between vertices 410a and 410c. An edge, such as edge 420f may be considered a shortcut path, which will be explained in further detail below.

Figure 5:
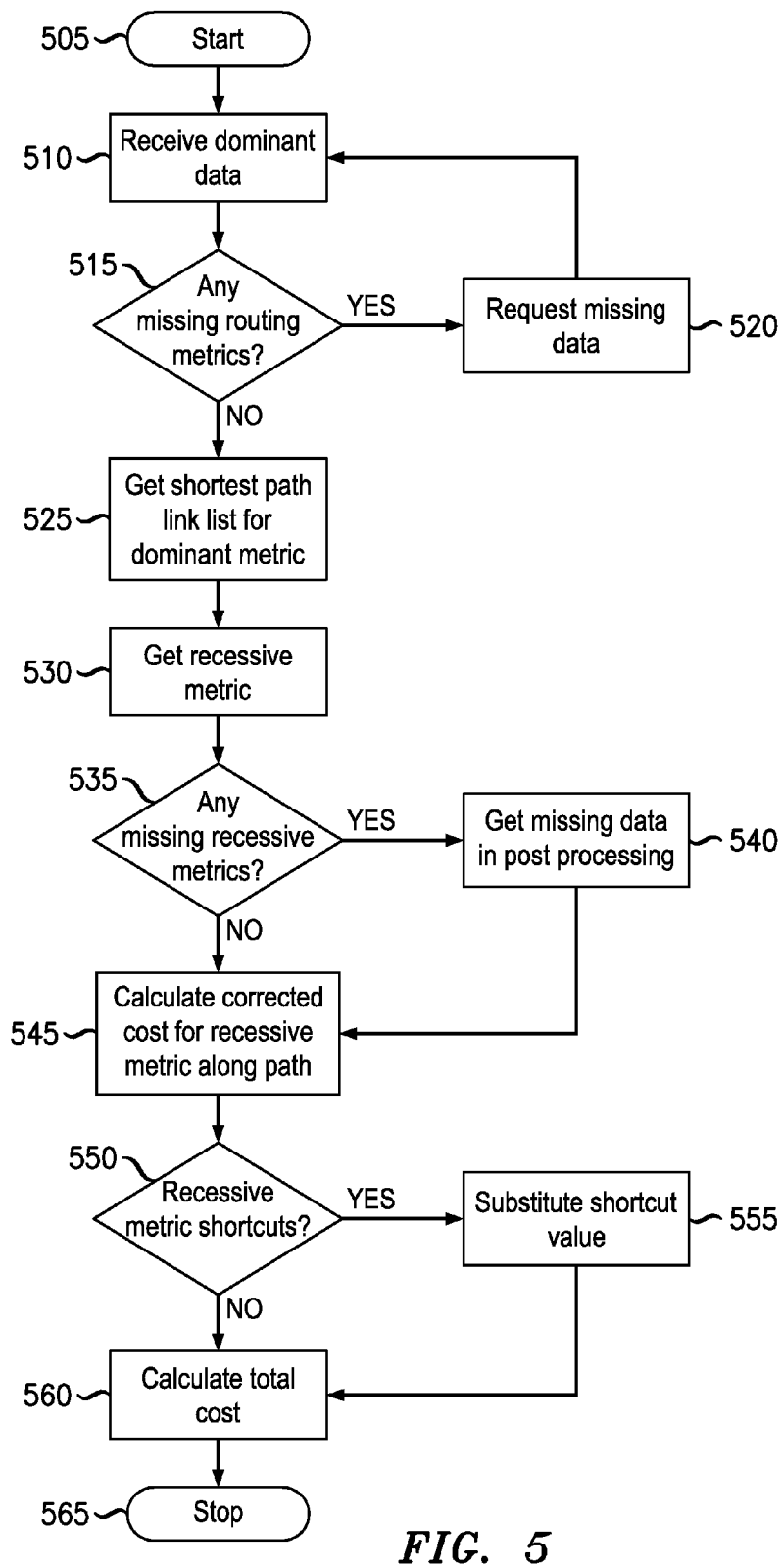
FIG. 5 illustrates a flowchart showing an exemplary method of determining a corrected total costs for a network topology.

FIG. 5 illustrates a flowchart showing an exemplary method 500 of determining corrected total costs for a network topology. The method 500 may be used to determine a total cost for a path between two endpoints within a network 100 or sub-network 110. The method 500 may be performed by a topology manager server 150. The network topology illustrated in FIG. 4 will be used as an example, but it should be apparent that the method 500 may be used to generate a total cost for any network topology. The method 500 may begin at step 505 and proceed to step 510.

In step 510, the topology manager server 150 may receive routing metric information. In step 515, the topology manager server 150 may determine whether any links are missing a routing metric. Topology manager server 150 may determine that a routing metric is missing if no routing metric is available for a connection where a direct connection exists. If a routing metric is missing, the method 500 may proceed to step 520. If no routing metrics are missing, the method 500 may proceed to step 525.

In step 520 the topology manager server 150 may request the missing data and return to step 510. The method 500 may require a routing metric for each connection. If a routing metric is unavailable, the method 500 may be unable to produce a total cost. Alternatively, the method 500 may assume that a connection is broken if no routing metric is available and attempt to route around the broken connection. As another alternative, the method 500 may use a default value.

In step 525, the topology manager server 150 may determine a path link list for two vertices 410 of the topology. The vertices may be endpoints within network 100. Various methods are known for determining the shortest path. For example, routers 130 may use a routing algorithm to select the shortest path. The topology manager server 150 may use a similar routing algorithm to determine the shortest path. For example, the topology manager server 150 may walk across the topology and perform the same routing decisions as each network node would make based on the routing metric. The topology manager server 150 may select the links having the best value for the routing metric. Accordingly, the shortest path determined by the topology manager server 150 may be the same as the actual routing of a packet through the network 100. The shortest path determined by the topology manager server 150 may have an initial cost based on the routing metric. The initial cost may be, for example, the total of the routing metric values for each link of the path. It should be apparent that the step 525 may be performed for a plurality of pairs of vertices. The topology manager server 150 may determine a path link list for a starting vertex and each possible destination. The topology manager server 150 may store partial paths for use in determining subsequent paths.

In step 530, the topology manager server 150 may receive recessive metric information. In step 535, the topology manager server 150 may determine whether recessive metric information is missing for any link. If recessive metric information is missing, the method 500 may proceed to step 540. If no recessive metric information is missing, the method 500 may proceed to step 545.

In step 540, the topology manager server 150 may request missing data for post processing. The topology manager server 150 may be able to determine a total cost without some recessive metric data. For example, if recessive metric information were missing for edge 420c, the topology manager server 150 may be able to substitute the recessive metric for edge 420f. As another example, topology manager server 150 may be able to use a default value for missing edges. The method may then proceed to step 545.

In step 545, the topology manager server 150 may calculate a corrected cost for the recessive metric along the shortest path. The corrected cost may be based on relative weights assigned to each recessive metric and the routing metric. In various embodiments, the recessive metric may be assigned the full weight. In such embodiments, the routing metric may determine the path, but the recessive metric may determine the cost for the topology. In other embodiments, weights may be assigned to each metric, e.g., by a network analyst. For example, a network analyst may assign weights according to the effect on a user's perceived quality of experience.

In step 550, the topology manager server 150 may determine whether the recessive metric information includes any shortcut edges. A shortcut edge may be an edge between two non-adjacent vertices on the shortest path that is associated with a recessive metric. For example, edge 420f may provide a value for metricB between vertex 410a and vertex 410c. If the recessive metric information includes a shortcut edge, the method 500 may proceed to step 555 where the topology manager server 150 may substitute the shortcut edge value for a plurality of edges in the path connecting the vertices. For example, the edge 420f may be substituted for the edge 420c and 420d. The topology manager server 150 may be configured with various rules for determining whether to substitute a shortcut value. For example, topology manager server 150 may substitute the metric value for a shortcut edge if the shortcut edge value is less than the substituted edge values. Rules governing shortcut values may be based on the particular recessive metric.

In step 560 the topology manager server 150 may calculate a total cost for the path based on the corrected cost for the recessive metric at each edge. A formula for determining the total cost may depend on the type of metric. For example, an additive metric such as latency may be summed to determine the total cost. As another example, the total cost for a concave metric such as path bandwidth may be determined as the minimum corrected cost value along the path. Topology manager server 150 may be configured with any formula based on the recessive metrics available to provide a useful metric for end users. The method 500 may then proceed to step 565, where the method 500 ends.

Figure 6:
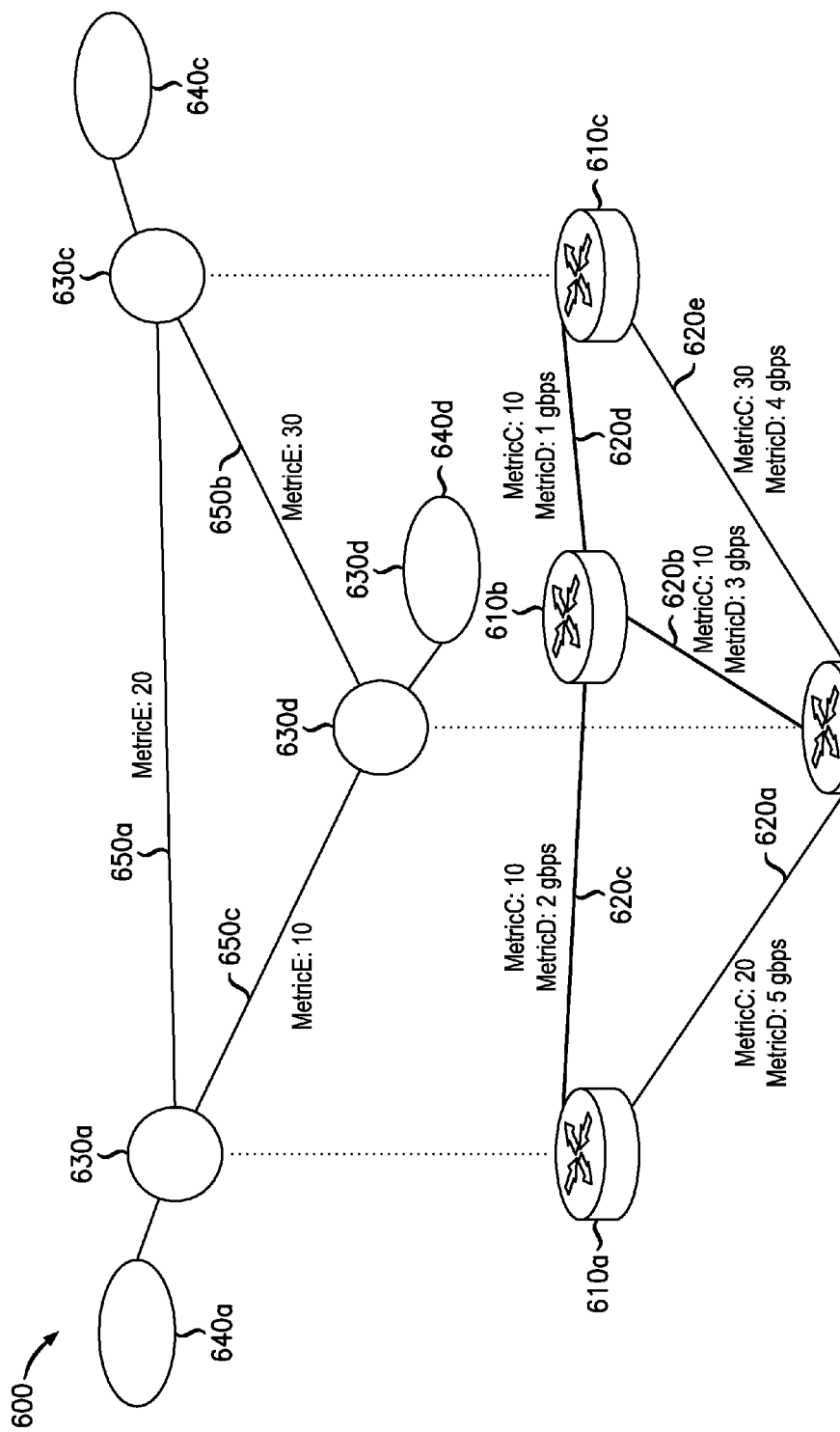
FIG. 6 illustrates a schematic diagram of a multi-layer network topology.

FIG. 6 illustrates a schematic diagram of a multi-layer network topology 600. The multi-layer topology may include a virtual private network (VPN) implemented over the transport layer. The transport layer may include vertices 610 which correspond to routers, and edges 620 that correspond to connections. The edges 620 may be associated with metrics including routing metrics and recessive metrics. For example, in FIG. 6, metric C may be a routing cost which may be used as the routing metric. Metric D may be a first recessive metric such as capacity associated with the transport layer. The VPN may include endpoints 630 that may correspond to vertices 610 and VPN sites 640 located behind the VPN endpoints. Some vertices 610 may not be associated with a VPN endpoint 630. For example, vertex 610b may be a core router that does not correspond to a VPN endpoint. Such a vertex may route VPN tunneled packets without performing any analysis. Metric E may be a second recessive metric such as latency measured in the VPN. Accordingly, point-to-point values may be available for metric E.

The topology manager server 150 may determine a total cost in a similar manner as described above regarding FIG. 6. An edge in the VPN such as edge 650a, which has a value for point-to-point metric E, may be treated as a shortcut. A total cost formula for the multi-layer network topology 600 may include metrics from each level, each metric having a weight. Also, because metric D, capacity, may be a concave metric, the total cost for each metric along the path may be determined before applying the weight. It may also be necessary to invert a metric where a high value is desirable. For example, the capacity between vertex 610a and vertex 610c may be the minimum value, 1 gbps. An exemplary formula for weighting the metrics may be: total cost=1/capacity+ delay/10. Using this formula the total cost between vertices 610a and 610c would be 3. It should be noted that although a path travelling through vertex 610d might, in theory, have a better metric, such metric may be irrelevant because the routing metric, metricC, determines that the path does not traverse vertex 610d. It should be appreciated that topology manager server 150 may be configured with various formulas for determining the total cost based on the available recessive metrics. A multi-level network topology may use normalization and abstraction before exposing the network topology. For example, the multi-layer topology may identify network nodes by the VPN endpoint names rather than the underlying routers.

Figure 7:
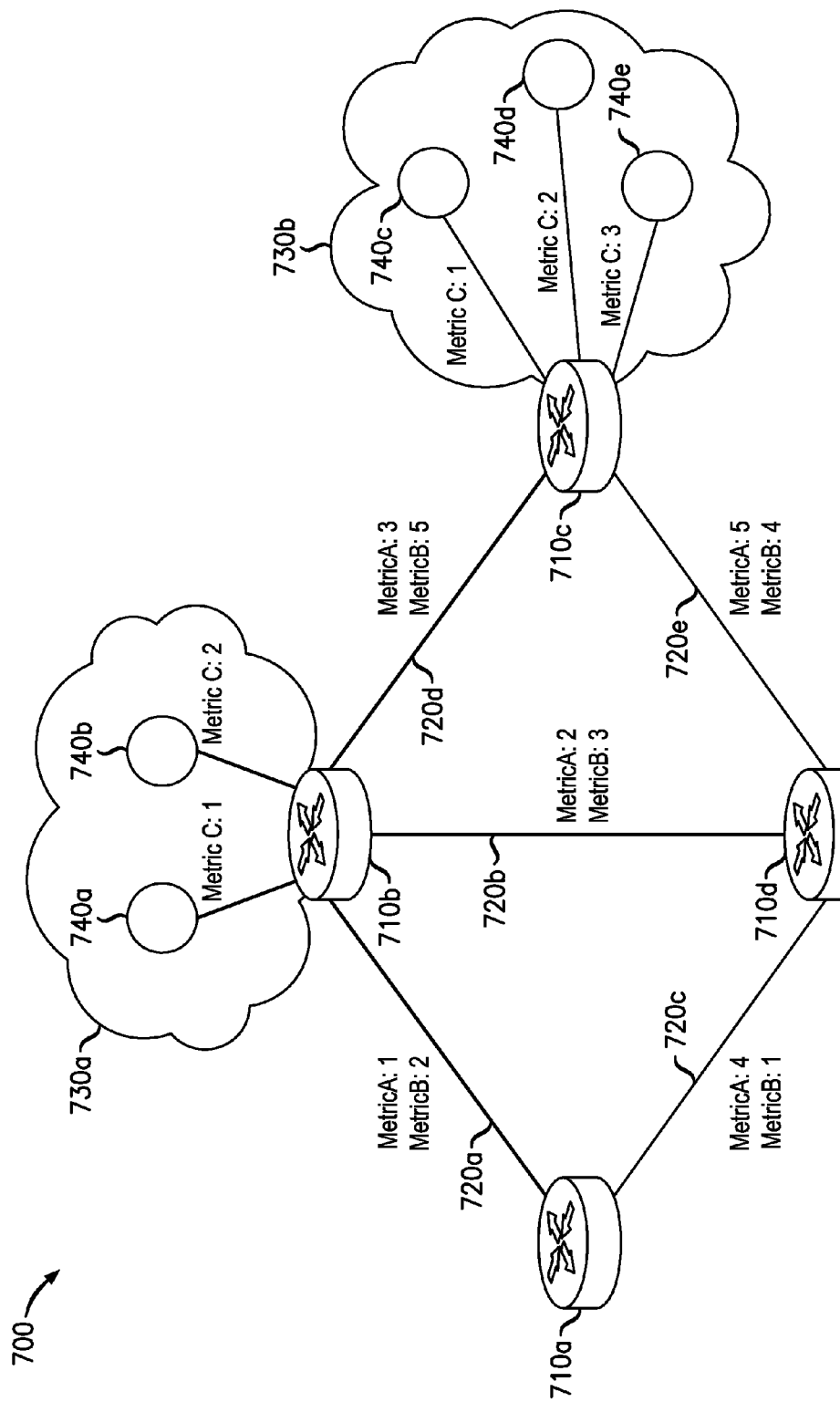
FIG. 7 illustrates a schematic diagram of an extended network topology.

FIG. 7 illustrates a schematic diagram of an extended network topology 700. The extended network topology 700 may include vertices 710 corresponding to the routers 130 of sub-network 100 as well as additional vertices 740 corresponding to network nodes located in connected networks 730 such as networks 120. Each connected network 730 may provide routing information such as EGP information to an edge router of sub-network 100. The routing information may include, for example, a next hop and a path length for each destination in the connected network 730. The routing information may be considered routing metrics for determining a total cost. The edge routers 130 may forward routing information to the topology manager server. Such routing information may be used to extend the network topology to include the destinations located in connected networks 730.

Figure 8:
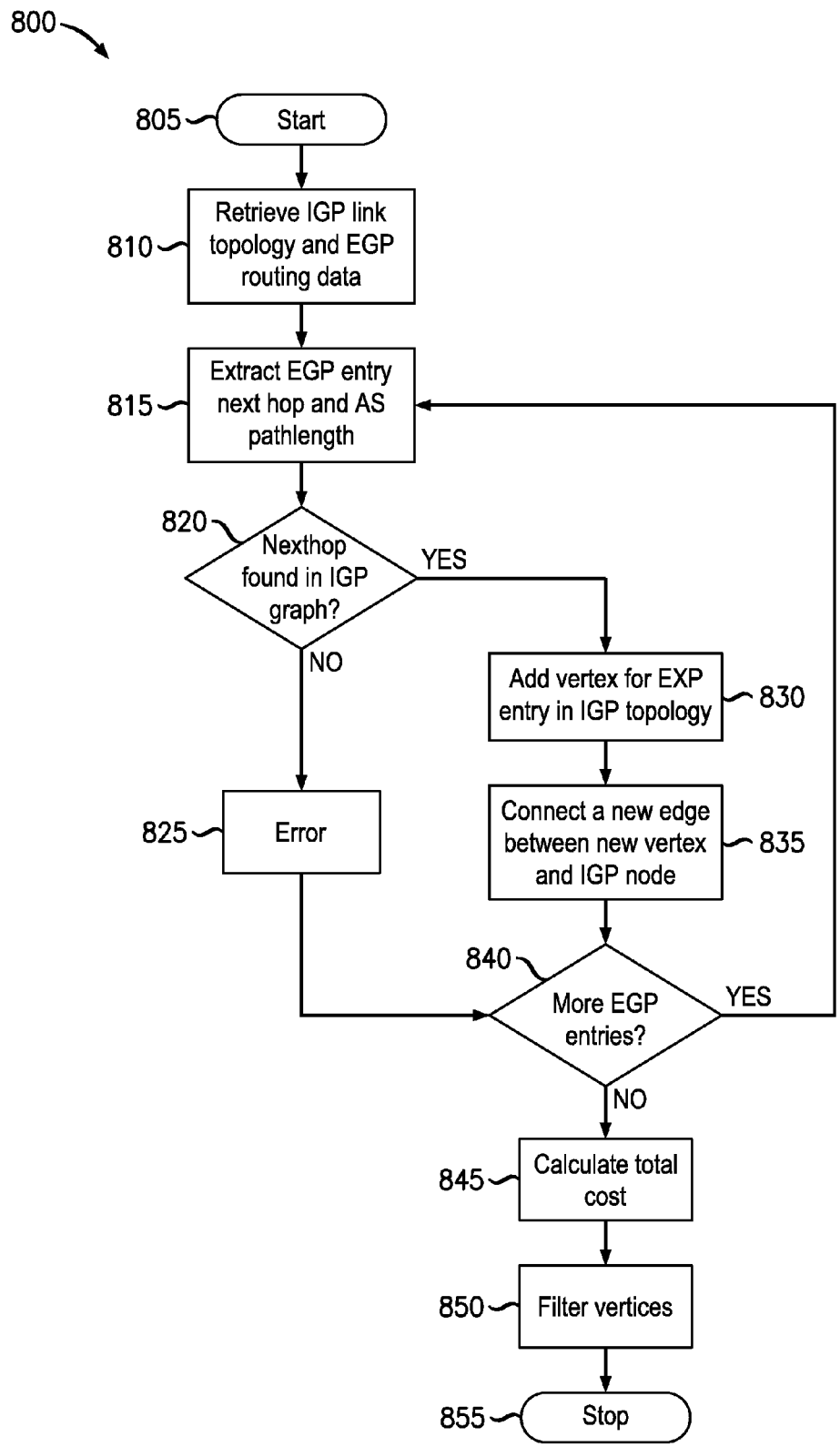
FIG. 8 illustrates a flowchart showing a method of generating an extended network topology.

FIG. 8 illustrates a flowchart showing a method 800 of generating an extended network topology 700. The method 800 may be performed by a topology manager server 150. The method 800 may begin at step 805 and proceed to step 810.

In step 810, the topology manager server 150 may receive routing information including, for example, IGP link topology data and EGP routing data. The IGP link topology data may include a routing metric used to route packets within sub-network 100. The IGP link topology data may be in the form of a topology graph such as those described above regarding FIGS. 4 and 6. The EGP routing data may indicate a routing metrics used to route packets to a connected sub-network 730. The topology manager server 150 may receive EGP routing data from a plurality of connected networks 730. In various embodiments, the EGP routing data may further include recessive metrics providing additional information regarding a connected network 730.

In step 815, the topology manager server 150 may extract a next hop and path length from an EGP entry for a destination 740 located within a sub-network 120. The next hop may indicate a router 130 within network 110 that may be connected to a connected network 120. Accordingly, the next hop may be considered a routing metric that determines the routing path to the destination 740. The path length may be an autonomous system (AS) path length indicating the number of hops within the connected network 120 to the destination 740. In various embodiments, the path length may also be used as a routing metric to determine a routing path to the destination 740. Alternatively, the routing path may be determined by only the IGP routing metric and the next hop.

In step 820, the topology manager server 150 may determine whether the next hop is found in the IGP link topology graph. If the next hop is found in the IGP link topology graph, the method 800 may proceed to step 830. If the next hop is not found in the IGP link topology graph, the method 800 may proceed to step 825.

In step 825, the topology manager server 150 may determine that there is an error in the routing information. In various embodiments, topology manager server 150 may take action to correct the error. The topology manager server 150 may request corrected data. For example, the topology manager server 150 may query an address indicated as the next hop to determine whether the node exists and can provide IGP data. Alternatively, if the next hop cannot be located, the topology manager server 150 may exclude the EGP destination from the topology. The method 800 may then proceed to step 840.

In step 830, the topology manager server 150 may add a vertex for the EGP destination 740 to the IGP topology. The EGP destination 740 may be associated with a range of IP addresses. In step 835, the topology manager server 150 may add a new edge between the newly added vertex 740 and the next hop vertex 710. The topology manager server 150 may associate the new edge with the path length value as a metric value. The path length value may be considered a routing metric.

In step 840, the topology manager server 150 may determine whether there are additional EGP entries in the received EGP information. If there are additional entries, the method 800 may return to step 815 and proceed through steps 820, 830, and 835 to add the EGP destination of the EGP entry to the topology.

In step 845, the topology manager server 150 may calculate a total cost between two vertices. The topology manager server 150 may calculate the total cost using a method similar to method 500. The topology manager server 150 may determine the routing path within the network 110 according to the IGP routing metric. In various embodiments, it may be possible for an EGP destination 740 to be associated with a plurality of edges, for example, if the EGP destination 740 is reachable through a plurality of sub-networks 120. In such embodiments, a shortest routing path may be selected based on both the IGP routing metric and the EGP path length. The topology manager server 150 may then determine a total cost for the routing path based on at least the EGP path length. In various embodiments, a formula for the total cost may be based on the EGP path length and a recessive metric for edges 720 within the sub-network 110. The IGP routing metric may also be weighted in a formula for total cost. For example, the total cost may be a weighted average of the IGP routing metric, the EGP path length, and a recessive metric.

According to the foregoing, various exemplary embodiments provide for generating a network topology including total costs for routing paths. In particular, by correlating a routing metric with a recessive metric, the total cost may accurately account for recessive metrics in the network topology.

It should be apparent from the foregoing description that various exemplary embodiments of the invention may be implemented in hardware and/or software running on hardware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method comprising:
    receiving a first metric for a plurality of links in a network, the first metric being a routing metric used to determine routing in the network;
    determining a routing path including a subset of the links based on the first metric, the routing path having an initial cost based on the first metric;
    receiving second metric information including a second metric that is different from the first metric;
    calculating a corrected cost for the routing path based on the second metric information, wherein at least one of the metrics is based on an element of an external gateway protocol autonomous system;
    receiving a third metric, the third metric being a routing metric used to determine routing for a second plurality of links in the network; and
    updating the routing path based on the third metric to include the second plurality of links,
    wherein calculating a corrected cost for the routing path based on the second metric comprises calculating a corrected cost for the routing path based on the second metric and the third metric.

2. The method of claim 1, wherein the second metric information includes a routing metric used to determine routing for a second plurality of links in the network.

3. The method of claim 2, wherein the first metric is an interior gateway protocol (IGP) routing cost and the second metric is external gateway protocol (EGP) autonomous system (AS) path length.

4. The method of claim 1, wherein the step of calculating a corrected cost for the routing path based on the second metric comprises determining a total value of the second metric information associated with the subset of the links.

5. The method of claim 1, wherein the second metric is a recessive metric.

6. The method of claim 1, further comprising:
    determining that the second metric is unavailable for a missing link of the first plurality of links; and
    requesting second metric data for the missing link.

7. The method of claim 1, further comprising:
    determining that a shortcut second metric is available for two non-adjacent vertices in the routing path; and
    substituting the shortcut second metric for a plurality of individual second metrics associated with links between the two non-adjacent vertices.

8. The method of claim 1, wherein the first metric and the second metric information are received from different sources.

9. The method of claim 1, further comprising:
    receiving third metric information including a point-to-point metric; and
    determining that the third metric information corresponds to a portion of the routing path,
    wherein calculating a corrected cost for the routing path based on the second metric comprises calculating a corrected cost for the routing path based on the second metric and the third metric.

10. The method of claim 1, further comprising:
    generating a network topology including a corrected cost for a plurality of routing paths; and
    exposing the network topology to an external application.

11. A non-transitory machine-readable storage medium encoded with instructions executable by a processor, the non-transitory machine-readable storage medium comprising instructions for:
    receiving a first metric for a first plurality of links in a network, the first metric being a routing metric used to determine routing in the network;
    determining a routing path including a first subset of the links based on the first metric, the routing path having an initial cost based on the first metric;
    receiving second metric information including a second metric that is different from the first metric;
    calculating a corrected cost for the routing path based on the second metric information, wherein at least one of the metrics is based on an element of an external gateway protocol autonomous system;
    receiving a third metric, the third metric being a routing metric used to determine routing for a second plurality of links in the network; and
    updating the routing path based on the third metric to include the second plurality of links,
    wherein the instructions for calculating a corrected cost for the routing path based on the second metric comprises calculating a corrected cost for the routing path based on the second metric and the third metric.

12. The non-transitory machine-readable storage medium of claim 11, wherein the first metric is an interior gateway protocol (IGP) routing cost for the first plurality of links and the second metric information includes an external gateway protocol (EGP) autonomous system (AS) path length for a second plurality of links, wherein the instructions for calculating a corrected cost for the routing path based on the second metric information comprise calculating a total cost for the routing path based on a weighted formula including the IGP routing cost for the first subset of links and the AS path length for a link of the second plurality of links.

13. The non-transitory machine-readable storage medium of claim 11, wherein instructions for calculating a corrected cost for the routing path based on the second metric comprise instructions for determining a total value of the second metric information associated with the subset of the links.

14. The non-transitory machine-readable storage medium of claim 11, wherein the second metric is a recessive metric.

15. The non-transitory machine-readable storage medium of claim 11, further comprising instructions for:
    determining that the second metric is unavailable for a missing link of the first plurality of links; and
    requesting second metric data for the missing link.

16. The non-transitory machine-readable storage medium of claim 11, further comprising instructions for:
    determining that a shortcut second metric is available for two non-adjacent vertices in the routing path; and
    substituting the shortcut second metric for a plurality of individual second metrics associated with links between the two non-adjacent vertices.

17. The non-transitory machine-readable storage medium of claim 11, further comprising instructions for:
    receiving third metric information corresponding to an application layer metric; and
    determining that the third metric information corresponds to a portion of the routing path,
    wherein the instructions for calculating a corrected cost for the routing path based on the second metric comprise instructions for calculating a corrected cost for the routing path based on the second metric and the third metric.

18. The non-transitory machine-readable storage medium of claim 11, further comprising instructions for:

generating a network topology including a corrected cost for a plurality of routing paths; and exposing the network topology to an external application.

\* \* \* \* \*